United States Patent [19]

Sherman

[11] 4,081,053
[45] Mar. 28, 1978

[54] LOCK VALVE FOR DOUBLE ACTING CYLINDER

[75] Inventor: Clarence A. Sherman, Birmingham, Mich.

[73] Assignee: Terry McDermid, Southfield, Mich.

[21] Appl. No.: 743,269

[22] Filed: Nov. 19, 1976

[51] Int. Cl.² .................... B62D 33/06; F15B 13/042
[52] U.S. Cl. .................................. 180/89.15; 91/420; 296/28 C
[58] Field of Search .................. 91/420; 137/106; 180/89.15; 296/28 C

[56] References Cited

U.S. PATENT DOCUMENTS

| | | | |
|---|---|---|---|
| 2,397,270 | 3/1946 | Kelly | 91/420 X |
| 2,720,755 | 10/1955 | Gardiner | 91/420 X |
| 2,926,634 | 3/1960 | Falendysz et al. | 91/420 X |
| 3,207,178 | 9/1965 | Nevulis et al. | 91/420 X |
| 3,233,407 | 2/1966 | Smith | 91/420 X |
| 3,242,825 | 3/1966 | Roosa | 251/25 X |
| 3,472,547 | 10/1969 | London | 91/420 X |
| 3,795,178 | 3/1974 | Roche | 91/420 |
| 3,818,936 | 6/1974 | Jackobdice et al. | 91/420 X |
| 3,975,987 | 8/1976 | Panis | 91/420 |

FOREIGN PATENT DOCUMENTS 306,798  6/1971  U.S.S.R. .................... 91/420

*Primary Examiner*—Irwin C. Cohen
*Attorney, Agent, or Firm*—Reising, Ethington, Barnard, Perry & Brooks

[57] ABSTRACT

A lock valve for a double acting cylinder including a housing that defines first and second fluid paths for supplying a control fluid to the cylinder to actuate pushing cylinder extension or pulling cylinder retraction and to positively locate the cylinder in any partially extended position. First and second spaced check valves are respectively disposed along the first and second fluid paths to normally prevent reverse fluid flow therealong from the cylinder. Aligned openings of the check valves are closed by spring biased valve elements thereof from the opposite side of each opening as the other check valve. A bore in the housing between the check valves slidably receives a control piston with first and second actuating portions for respectively moving the check valve elements upon piston movement in opposite directions to open the check valves and permit the reverse fluid flow from the cylinder. First and second sides of the control piston respectively surround the first and second actuating portions and are communicated with the first and second fluid paths as well as being biased by a pair of helical springs to provide a centering action of the control piston in a manner that prevents leakage from the cylinder. When control fluid is pumped through either fluid path, the associated check valve opens to permit fluid flow to the cylinder and the control piston is concomitantly moved against the action of the helical springs to open the other check valve and thereby permit reverse fluid flow from the cylinder. The helical springs encircle the actuating portions and have outer ends seated about the check valve openings as well as inner ends seated by a pair of stop members that respectively engage the first and second sides of the control piston. Stop surfaces on the housing are located at ends of the control piston bore and are spaced from each other the same distance as the length of the control piston so that each engages the control piston in its center position. The lock valve housing is preferably mounted on one end of a double acting cylinder opposite the cylinder end through which its piston connecting rod extends and is thereby particularly adaptable for use as a tilting cab control cylinder. A bore through the housing connects the first fluid path with the cylinder to provide its extension while a conduit connects the second fluid path with the cylinder to provide its retraction.

3 Claims, 3 Drawing Figures

LOCK VALVE FOR DOUBLE ACTING CYLINDER

BACKGROUND OF THE INVENTION

1. Field of the Invention

This invention relates to a lock valve for use with double acting cylinders and is particularly adaptable for use with a tilting cab control cylinder of the double acting type to provide cab movement between lower use and upper access positions.

2. Description of the Prior Art

Double acting cylinders are well known and basically consist of a housing defining a cylinder bore and a piston that is sealingly slidable in the housing bore with a connecting rod extending from the piston out of the housing through a sealed opening. On opposite sides of the piston, the housing bore is divided into chambers into which a control fluid is pumped to provide piston movement that extends or retracts the piston connecting rod in a pushing or pulling manner. Pressurized control fluid pumped to a push chamber of the cylinder on the side of the piston opposite the connecting rod moves the piston so that the connecting rod is extended to provide a pushing cylinder action. Pressuring control fluid pumped to a second pull chamber of the cylinder on the side of the piston to which the connecting rod is secured moves the piston to retract the connecting rod in a pulling cylinder action. Both chambers are normally filled with the control fluid which flows from one chamber or the other back to a fluid reservoir as the pressurized fluid is pumped to the opposite chamber to operate the cylinder. Four-way valves are conventionally utilized to selectively and alternately supply the control fluid from a pump to either the push or pull cylinder chamber to actuate cylinder extension or retraction.

When double acting control cylinders are used with vehicle tilting passenger cabs, one end of the cylinder is connected to the vehicle frame while the other end of the cylinder is connected to the cab. Cylinder extension tilts the cab from a lower use position to an upper access position where the vehicle engine is accessible for maintenance and repair. Cylinder retraction moves the cab in the opposite direction back to its use position. During movement between the use and access positions, the cab center of gravity moves forwardly and rearwardly of a transverse vehicle axis about which the cab is supported on the vehicle frame for its tilting movement. As such, as the cylinder is being extended to move the cab from its lower use position to its upper access position, the force of gravity pulls on the cylinder as the center of gravity moves forwardly of the tilting axis and the consequent pulling action on the cylinder piston thus tends to move the control fluid within the pull chamber of the cylinder back to the reservoir. Likewise, as the cylinder is being retracted to move the tilting cab back to its use position, the cab center of gravity moves rearwardly of the tilting axis and subsequently biases the cylinder piston to tend to move the control fluid from the push chamber back to the reservoir. In order to prevent fluid from flowing back to the reservoir under these two situations, it is known to utilize a lock valve between the cylinder and the associated four-way valve.

Lock valves utilized with tilting cab control cylinders, as well as with other double acting cylinders where the load can exert a force on the cylinder in opposite directions from a center position, conventionally include first and second fluid paths including respective check valves for preventing reverse fluid flow from the cylinder to the four-way valve and the reservoir. A control piston is slidable within a bore between the check valves and has opposite sides communicated with the fluid paths. Actuating portions of the control piston are provided for opening the check valves as the control piston slides in opposite directions. Pumped fluid supplied to one fluid path opens the check valve thereof and also causes piston movement toward the other check valve to open it and permit reverse fluid flow from the cylinder as it is moved in either an extending or retracting direction by the pumped fluid supplied through the one path. Biasing springs of the check valves must be sufficiently strong to move the control piston within its bore or closure of the valves will not take place.

In certain situations, leakage flow can occur with tilting cab control cylinders of the double acting type. This leakage can take place when the cylinder is partially driven in either direction past the point where the cab center of gravity moves over the axis of tilting movement without being moved completely to the other position. The cab weight then acts on the cylinder in the same direction it is being driven and thereby pressurizes fluid within the opposite chamber as the chamber to which fluid is being pumped. In such cases, slightly pressurized fluid from the four-way valve, such as for example due to the weight of the pump handle itself left in the up position or with the additional weight of a piece of clothing or the like draped over the pump handle, is sufficient to move the control piston without opening the check valve of the fluid path in which the slightly pressurized fluid is being supplied. This is due to the fact that check valve opening is much smaller than the size of the piston and, as such, the piston movement can open the other check valve which thus permits the reverse leakage flow and consequent cab movement all the way to the other position. A dangerous situation can then occur in which a cab operator or another person can become trapped between the tilting cab and the vehicle frame unable to move due to the cab weight.

SUMMARY OF THE INVENTION

An object of the present invention is to provide an improved lock valve for use with a double acting cylinder so as to prevent unintended retraction or extension of the cylinder from any partially extended position due to forces applied to the cylinder.

A preferred embodiment of the lock valve that carries out the above object is utilized with and functions as a component of a double acting cylinder for a tilting cab. However, other double acting cylinders used in environments where forces are applied thereto in opposite directions from a partially extended cylinder position are also contemplated. It is preferable to have the lock valve contructed as a component of the cylinder as opposed to operating therewith from a remote location interconnected by conduits in order to prevent the possibility of conduit rupturing and consequent failure of the lock valve operation.

The tilting cab control cylinder incorporating the lock valve includes a housing having one end that has a lock valve housing portion fixedly secured thereto. A piston connecting rod at the other end of the cylinder extends into the cylinder housing within a bore thereof and is secured to a piston that is sealingly slidable within the bore. A first push chamber is defined within the bore on the side of the piston opposite the connecting rod and a second pull chamber is defined therein on the other side of the piston about the connecting rod. Fluid is pumped to and received from the cylinder by a combined pump and four-way valve control unit mounted on a fluid reservoir. First and second paths through the lock valve housing portion respectively communicate with the first and second cylinder chambers to permit fluid flow between the cylinder and the reservoir.

Within the lock valve housing portion, first and second check valves respectively disposed along the first and second fluid paths are spaced from each other in an aligned relationship and normally prevent reverse fluid flow therethrough from the cylinder. Each check valve includes an opening and a spring biased valve element that closes the opening from the opposite side thereof as the other check valve. A control piston bore in the housing portion between the check valves slidably receives a control piston having first and second actuating portions respectively disposed within the first and second fluid paths. A control piston bias, preferably embodied as a pair of helical springs that respectively encircle the control piston actuating portions, normally locates the control piston in a center position with each check valve closed. Pressurized control fluid pumped to one of the fluid paths opens its check valve to supply fluid to the cylinder and thereby cause cylinder movement in either an extending or retracting direction. Concomitantly, the pressured fluid pumped within the one fluid path acts on the control piston and moves it toward the check valve of the other fluid path so that the actuating portion of the control piston disposed within this other fluid path opens the check valve thereof and permits reverse fluid flow therethrough from the cylinder as the cylinder is moved by the control fluid pumped thereto through the one fluid path. The bias of the check valve elements is relatively light such that the fluid pressure required to open each check valve is less than the fluid pressure required to move the control piston. As such, a slightly pressurized control fluid supplied to either fluid path while a force is applied to the cylinder by the cab through gravity in a corresponding direction will not open the check valve of the other fluid path and permit reverse fluid flow from the cylinder under the action of the gravity force.

Outer ends of the control piston helical biasing springs are respectively seated by seats of the check valves about their respective openings. Inner ends of these biasing springs are seated by stop members respectively associated with first and second opposite sides of the piston. Each stop member has an aperture receiving the adjacent control piston actuating portion and is limited in movement away from the adjacent check valve by an annular stop surface of the lock valve housing portion. The control piston has a length equal to the distance between the stop surfaces of the housing portion such that each stop member engages the associated stop surface and the piston in the center position of the control piston. Check valve holes within the lock valve housing portion are aligned with the control piston bore and with each other and receive fittings that mount threaded check valve plugs which define the check valve openings. The spring seat of each check valve is provided on its plug encircling the valve opening thereof in order to seat the outer end of the adjacent control piston biasing spring.

Pressurized fluid flowing through the first check valve of the first fluid path is supplied to the first push chamber of the cylinder bore by an axial passage in the lock valve housing portion to cause cylinder extension. Pressurized fluid flows from the second check valve through an external conduit to the second pull chamber of the cylinder bore to cause retraction of the cylinder.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
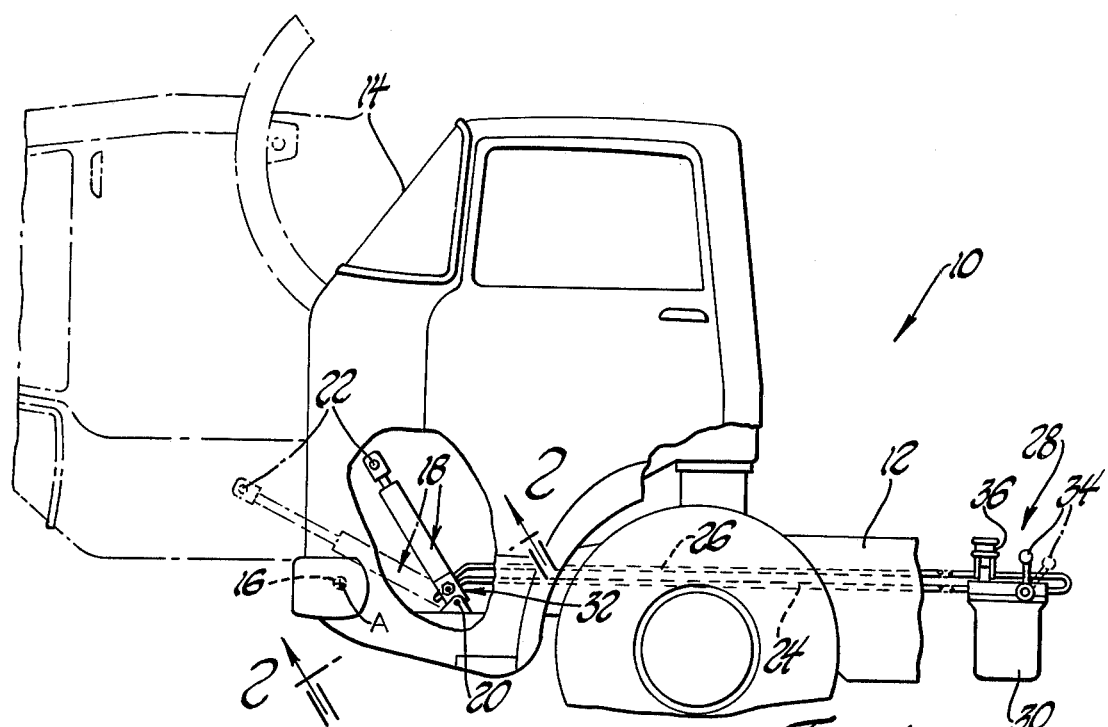
FIG. 1 is a side elevation view of a tilting cab vehicle having a control cylinder with a lock valve constructed in accordance with the present invention.

Referring to FIG. 1, a vehicle of the tractor type is indicated by 10 and includes a frame 12 and a tilting cab 14 that is mounted on the frame by a pintle 16 for movement about a transverse vehicle axis A. A double acting control cylinder 18 has one end connected to the frame 12 by a pivot 20 and a second end connected to the cab 14 by a pivot 22. A hydraulic control fluid is supplied to the cylinder 18 by a first conduit 24 to cause cylinder extension from the solid line position shown to the phantom line position in order to raise the cab from the lower use position shown by solid lines to the upper access position shown by phantom lines. In the access position, the vehicle engine is accessible for maintenance and repair. A second conduit 26 supplies hydraulic control fluid to the cylinder 18 to retract the cylinder from its extended phantom line position to its retracted solid line position in order to move the cab back from the access position to the use position. A combined pump and four-way valve control unit indicated collectively by 28 supplies the hydraulic control fluid to the conduits 24 and 26 from a reservoir 30. When either conduit 24 or 26 is supplying control fluid to the cylinder 18, the other conduit is permitting the control fluid within the cylinder to flow back to the reservoir 30 in a manner that is hereinafter described. Also, as the cab 14 moves between its use and access positions, the cab center of gravity moves forwardly and rearwardly across a vertical line through the axis A about which the cab tilts. Prior to crossing this vertical line from either direction, the cylinder 18 provides a driving force that moves the cab upwardly. However, subsequent to causing the vertical line, a lock valve 32 of the cylinder functions to prevent downward cab movement under the bias of gravity except as permitted by the pumping action of control unit 28. A four-way valve handle 34 of unit 28 is selectively and alternately positioned in the solid or phantom line position shown so that upward and downward movement of a pump handle 36 provides pumped hydraulic fluid from the reservoir to either conduit 24 or 26.

Figure 3:
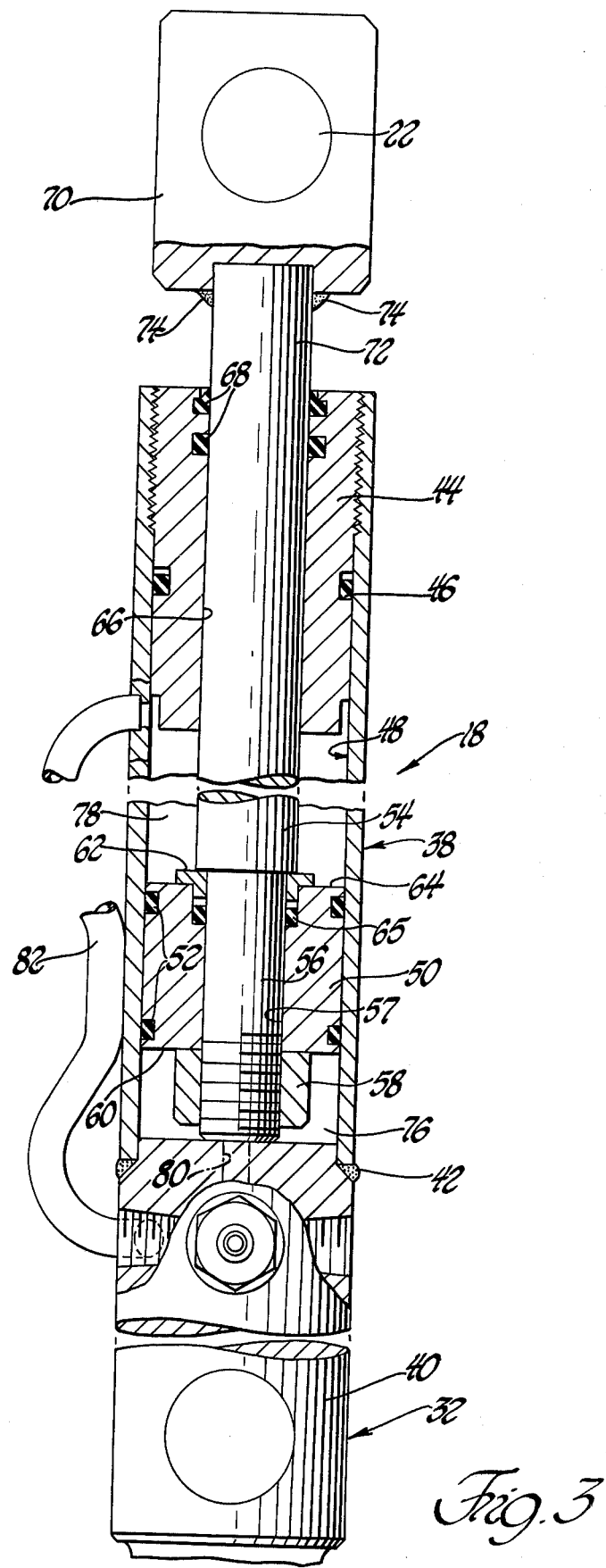
FIG. 3 is a longitudinal sectional view of the cylinder taken along line 3—3 of FIG. 2.

As seen in FIG. 3, control cylinder 18 includes an elongated housing 38 having a lock valve housing portion 40 secured to one end thereof by a weld 42 and an end closure 44 threaded into the other end thereof and sealed by an O-ring 46. Between its ends, the cylinder housing 38 defines an elongated bore 48 with a round cross section. A piston 50 is slidably received within the cylinder bore 48 for movement between its opposite ends and is sealed in this slidable relationship by a pair of O-rings 52. A piston connecting rod 54 has one end 56 extending through an axial hole 57 in piston 50. Rod end 56 is secured by a nut 58 on a first side 60 of the piston and cooperable fitting 62 on a second side 64 of the piston. Between nut 58 and fitting 62, an O-ring 65 seals between piston 50 and rod end 56 within hole 57. Connecting rod 54 extends outwardly through an axial hole 66 in end closure 44 in a slidably sealed relationship provided by a pair of O-rings 68. An attachment member 70 is secured to an outer end 72 of the connecting rod by welds 74 and receives the pivot pin 22 which connects the cylinder to the tilting cab.

With reference to FIG. 3, cylinder piston 5 divides the cylinder bore 48 into a first push chamber 76 on the first piston side 60 and a second pull chamber 78 on the second piston side 64. Pressurized fluid pumped into push chamber 76 from lock valve 32 through an axial bore 80 shown by phantom lines moves the piston to provide pushing extension of the cylinder. Likewise, an external conduit 82 feeds pumped hydraulic fluid from the lock valve 32 to the pull chamber 78 in order to move the piston in a direction that provides pulling retraction of the cylinder. As the cylinder is being extended, conduit 82 permits fluid to flow in a reverse direction from the chamber 78 to the lock valve. In a similar manner, bore 80 permits fluid to flow in a reverse direction from the chamber 76 to the lock valve 32 when the cylinder is being retracted. From the lock valve, the reversely flowing fluid is fed back to reservoir 30 through conduits 24 and 26. Each of the bore chambers 76 and 78 is completely filled with hydraulic control fluid at all times by the operation of the lock valve 32 in order to positively locate the cylinder in its retracted and extended positions as well as any partially extended position.

Figure 2:
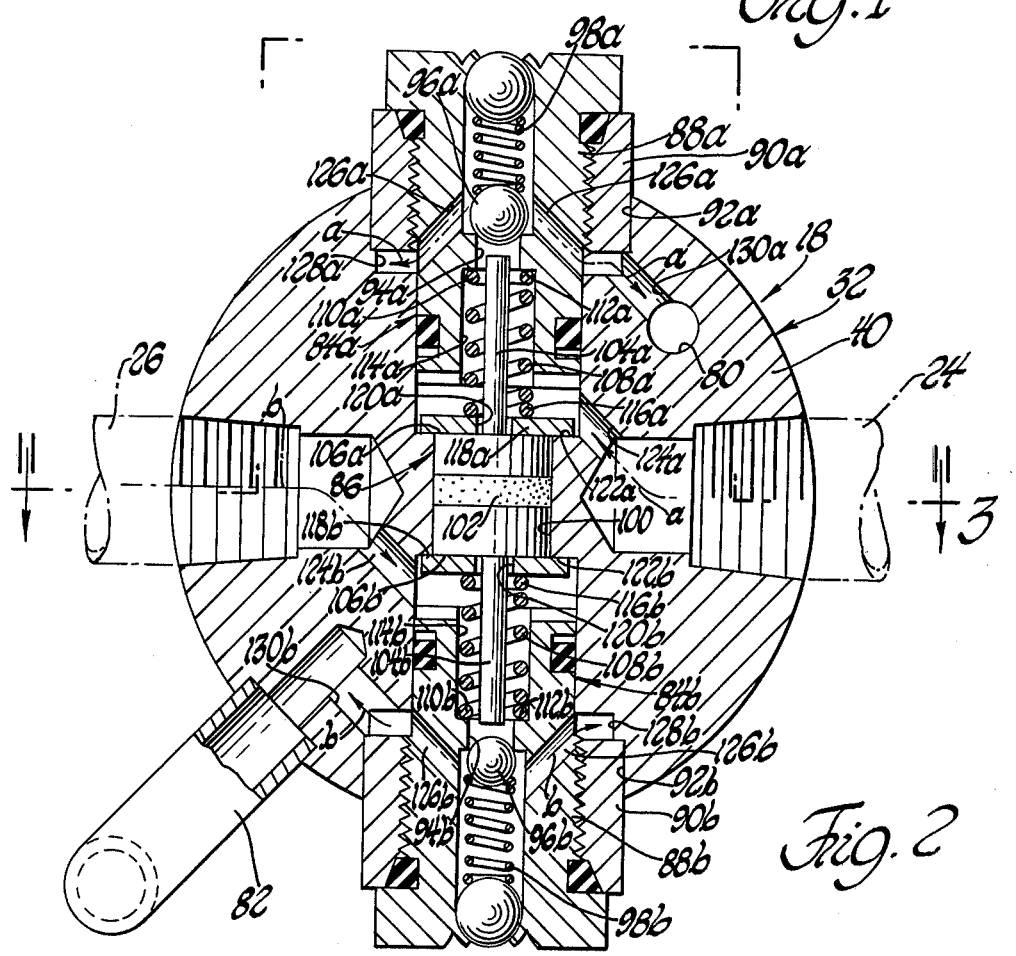
FIG. 2 is a cross sectional view through the cylinder showing the lock valve thereof and is taken approximately along line 2—2 of FIG. 1.

Lock valve 32 is shown in FIG. 2 as including first and second fluid paths respectively indicated by arrows $a$ and $b$ for supplying pumped hydraulic control fluid to the first and second cylinder chambers 76 and 78 (FIG. 3). First and second check valves 84a and 84b are respectively disposed along the first and second fluid paths and cooperate with a control piston 86 of a round cross section in controlling the movement of fluid through the lock valve. Check valves 84a and 84b include threaded plugs 88a, 88b that are mounted by internally threaded fittings 90a, 90b press fitted into aligned check valve holes 92a, 92b within the lock valve housing portion 40. Plug openings 94a, 94b through which the first and second fluid paths flow are aligned with each other and are normally closed by valve elements in the form of balls 96a, 96b. Relatively light biasing springs 98a, 98b seat their associated balls to close each valve opening from the opposite side thereof as the other check valve.

Between the check valves 84a and 84b, the lock valve housing portion 40 shown in FIG. 2 defines a round bore 100 that slidably receives the control piston 86 in a sealed relationship accomplished with a seal 102. Actuating projections or portions 104a, 104b of the control piston extend from first and second piston sides 106a, 106b and function to open the check valves 84a and 84b in response to control piston movement upwardly or downwardly. A pair of helical biasing springs 108a, 108b normally locate the control piston 86 at the center position shown except when pressurized control fluid is pumped to either conduit 24 or 26 as previously discussed. The control piston biasing springs 108a, 108b have respective outer ends 110a, 110b that are engaged with spring seats 112a, 112b on the check valve plugs about their associated openings 94a, 94b. The biasing springs 108a, 108b extend from these seats through plug holes 114a, 114b and have inner ends 116a, 116b that engage associated stop members 118a, 118b. Central apertures 120a, 120b in the stop members receive the control piston actuating portions 104a, 104b with the inner spring ends seated by the stop members about their apertures. Annular stop surfaces 122a, 122b on the housing portion 40 engage the peripheral edges of the stop members 118a, 118b to limit the biasing effect of the springs in each direction. Control piston 86 has a length between its opposite sides 106a, 106b equal to the spacing between the stop surfaces 122a, 122b so that each stop member is engaged with both the piston and the associated housing stop surface in the center position shown.

When control fluid is pumped to the cylinder 18 through conduit 24 in order to provide cylinder extension, the fluid flows through an inclined passage 124a and then through the check valve hole 114a torward its opening 94a. The bias of spring 98a is relatively light, on the order of 1/10th or so the bias of springs 108a, 108b and deflects to permit the pumped fluid to move the valve ball 96a upwardly so that the fluid can flow through the opening past the check valve. Inclined passages 126a in the check valve plug 88a permit the fluid to flow to an annular passage 128a cooperatively defined by plug 88a, valve fitting 90a, and housing hole 92a. From passage 128a, the fluid flows to an inclined passage 130a into the axial housing bore 80. Fluid flow through the bore 80 provides cylinder extension as previously discussed. As the flow takes place to cause cylinder extension in the manner described along fluid path $a$, pressurized fluid flows through stop member opening 120a and acts on the upper piston side 106a to move control piston 86 downwardly against the bias of spring 108b. Control piston actuating portion 104b moves downwardly with the piston to engage the check valve ball 96b and move it downwardly against the bias of spring 98b and thereby open check valve 84b. Reverse fluid flow through this check valve from the cylinder is then permitted. This fluid flow proceeds on a reverse direction along the second fluid path $b$ through the conduit 82, into the inclined passage 130b and to the annular passage 128b from which it flows through the inclined passages 126b and upwardly through the valve opening 94b. Between each surge of pumped control fluid, the biasing spring 108b will move the control piston 86 back to its center position shown to prevent the reverse fluid flow.

When fluid is pumped to circuit 26 as shown in FIG. 2 in order to retract the cylinder, the fluid flows into the inclined passage 124b and from there through the check valve plug hole 114b to act against the valve ball 96b and its biasing spring 98b in order to open the valve 84b. After flowing through the valve opening 94b, the pumped control fluid flows through the inclined passages 126b into the passage chamber 128b and from there through the inclined passage 130b to the conduit 82. As pumped fluid flows through the conduit 82 to the cylinder, the cylinder is retracted in the manner previously described. This pumped fluid also flows through the stop member aperture 120b and acts against the lower side 106b of control piston 86 in order to move the control piston upwardly against the bias of spring 108a.

As the control piston moves upwardly its actuating portion 104a engages the check valve ball 96a to move the ball upwardly against the bias of spring 98a. Check valve 84a is then opened to permit reverse fluid flow along the first fluid path a from the cylinder through the lock valve. After each pumping surge, the biasing spring 108a moves the control piston 86 back to the center position shown so that there is positive positioning of the cylinder in any partially extended position as well as in the retracted and fully extended positions.

The biasing forces of valve springs 98a and 98b are small enough so that any pumped fluid of a sufficient pressure to act on either control piston 106a or 106b and move this piston against spring 108a or 108b will have first opened the check valve 84a or 84b in the path the fluid is pumped. For example, if hydraulic fluid is being pumped through conduit 26 to retract the cylinder and this cylinder retraction proceeds for a sufficient extent to move the cab center of gravity just rearwardly of the pivot 16 without going all the way to the lower use position, gravity will then act on the cab and tend to retract the cylinder. If the pump handle 36 is then left in its upper position, its own weight or the weight of a piece of clothing left on it can create a slight fluid pressure along the second fluid path b which would tend to open the check valve 84b. This valve opening will take place before any control piston movement that would open the check valve 84a and permit the reverse fluid flow from the cylinder under the gravity force acting on it so as to let the cab move downwardly. Similarly, if the cab is being moved upwardly to the access position and its movement is terminated just after the cab center of gravity moves forwardly of pivot 16, check valve 84a will have always opened prior to any control piston movement that tends to open check valve 84b and permit reverse fluid flow from the cylinder under the action of the gravity force applied to the cab. Cooperation of helical biasing springs 108a and 108b with control piston 86 thus provides positive positioning of the cylinder in any partially extended position as well as in the fully extended and retracted positions.

While a preferred embodiment has herein been described in detail, those skilled in the art will recognize various alternative designs and embodiments for practicing the present invention as defined by the following claims.

What is claimed is:

1. In a tilting cab control system for moving a tilting cab on an associated vehicle frame between use and access positions, a control cylinder of the double acting type comprising: an elongated housing defining a cylinder bore and having ends on opposite sides of the bore; a power piston sealingly slidable in the bore and having a connecting rod extending outwardly from the housing through one end thereof; said piston dividing the bore into pull and push chambers such that pressurized control fluid respectively provided thereto slides the piston with the bore to extend and retract the connecting rod and to thereby raise and lower the tilting cab with the cylinder connected between the cab and the associated vehicle frame; said other housing end including a lock valve housing portion having a round cross-section along the direction of power piston movement and defining the first and second fluid paths for respectively providing pressurized control fluid to the push and pull bore chambers; first and second check valves mounted on the lock valve housing portion spaced from each along a first axis perpendicular to the direction of power piston movement and respectively disposed along the first and second fluid paths; said check valves having respective openings aligned with each other along said first axis and also having respective valve elements for closing the valve openings from the opposite side thereof as the other check valve; each check valve including a biasing spring that biases the valve element thereof to a closed position preventing reverse fluid flow from the associated bore chamber through the valve opening thereof; a bore in the lock valve housing portion between the check valves in alignment with the openings thereof along said first axis; a control piston sealingly slidable within the lock valve housing portion bore along said first axis and having first and second actuating projections for respectively moving the check valve elements upon control piston movement in opposite directions to open the check valves against the action of the biasing springs thereof; said control piston having first and second sides facing in opposite directions respectively toward the first and second check valves; said first side of the control piston being in fluid communication with the first fluid path such that pressurized control fluid supplied thereto upstream from the first check valve flows downstream therethrough to the cylinder push chamber and concomitantly moves the control piston to open the second check valve to permit reverse fluid flow therethrough from the cylinder pull chamber; said second side of the control piston being in fluid communication with the second fluid path such that pressurized control fluid supplied thereto upstream from the second check valve flows downstream therethrough to the cylinder pull chamber and concomitantly moves the control piston to open the first check valve to permit reverse fluid flow therethrough from the cylinder push chamber; a pair of helical biasing springs respectively located between the control piston and the first and second check valves to bias the control piston along the first axis to a center position where the actuating projections thereof permit the valve elements of each check valve to remain in closed position except when pressurized control fluid is supplied to one of the fluid paths upstream from its check valve to act against the bias of the helical spring on the opposite side of the piston; said lock valve housing having first and second conduit openings disposed on opposite sides thereof along a second axis perpendicular to the first axis and to the direction of power piston movement; the lock valve housing portion including an axial bore parallel to the direction of power piston movement and communicating the downstream side of the first check valve and the cylinder push chamber; and the cylinder also including a conduit communicating the downstream side of the second check valve and the cylinder pull chamber.

2. A cylinder as claimed in claim 1 wherein the lock valve housing portion includes a pair of check valve fitting holes, check valve fittings respectively mounted within the holes and having threaded openings, and threaded check valve plugs received within the threaded openings of the fittings and defining the associated check valve openings, said plugs cooperating with the fittings and the fitting holes of the housing portion in defining the fluid paths downstream from the check valve openings.

3. A cylinder as claimed in claim 1 wherein the first and second fluid paths include respective passages communicating the conduit openings with the upstream sides of the check valves and the opposite sides of the control piston, and said passages being inclined with respect to said first and second axes.

* * * * *

UNITED STATES PATENT OFFICE
CERTIFICATE OF CORRECTION

Patent No. 4,081,053      Dated March 28, 1978

Inventor(s) Clarence A. Sherman

It is certified that error appears in the above-identified patent and that said Letters Patent are hereby corrected as shown below:

Column 2, line 34, after "fact" delete "that" and insert --the--.
    Column 5, line 15 "5" should be --50--.
    Column 6, line 54 "circuit" should be --conduit--.
    Column 7, line 21 "and tend" should be --to tend--.
    Column 7, line 57 "with" should be --within--.

Signed and Sealed this

Fifth Day of December 1978

[SEAL]

Attest:

RUTH C. MASON
Attesting Officer

DONALD W. BANNER
Commissioner of Patents and Trademarks